United States Patent [19]

Hoefer et al.

[11] Patent Number: 5,302,626
[45] Date of Patent: Apr. 12, 1994

[54] USE OF REACTION MIXTURES CONTAINING POLYESTER POLYOLS IN THE PRODUCTION OF SOLID POLYURETHANE MATERIALS BY CASTING

[75] Inventors: Rainer Hoefer, Duesseldorf; Gerhard Stoll, Korschenbroich; Peter Daute, Essen; Roland Gruetzmacher, Wuelfrath, all of Fed. Rep. of Germany

[73] Assignee: Henkel Kommanditgesellschaft auf Aktien, Duesseldorf, Fed. Rep. of Germany

[21] Appl. No.: 862,568

[22] PCT Filed: Dec. 17, 1990

[86] PCT No.: PCT/EP90/02215
§ 371 Date: Jun. 23, 1992
§ 102(e) Date: Jun. 23, 1992

[87] PCT Pub. No.: WO91/09894
PCT Pub. Date: Jul. 11, 1991

[30] Foreign Application Priority Data

Dec. 27, 1989 [DE] Fed. Rep. of Germany ....... 3943080

[51] Int. Cl.$^5$ ................................................ C08G 18/14
[52] U.S. Cl. ........................................ 521/156; 521/172; 528/49
[58] Field of Search .................... 521/156, 172, 173; 528/49, 73, 74.5, 75; 252/182.24

[56] References Cited

U.S. PATENT DOCUMENTS 4,025,477  5/1977  Borden et al. ...................... 528/173

Primary Examiner—Maurice J. Welsh
Attorney, Agent, or Firm—Ernest G. Szoke; Wayne C. Jaeschke; Real J. Grandmaison

[57] ABSTRACT

The invention relates to the use of reaction mixtures containing polyester polyols which have been obtained by ring opening of epoxidized esters with carboxylic acids, as polyol component, optionally in admixture with polybutadiene diol, in the production of solid polyurethane materials by casting.

23 Claims, No Drawings

USE OF REACTION MIXTURES CONTAINING POLYESTER POLYOLS IN THE PRODUCTION OF SOLID POLYURETHANE MATERIALS BY CASTING

BACKGROUND OF THE INVENTION

1. Field of the Invention

The present invention is concerned with polyurethane materials and relates to the use of reaction mixtures containing polyester polyols as polyol component in the production of solid polyurethane materials by casting.

Solid polyurethane materials produced by casting are widely known in the prior art. They generally consist of the so-called "casting resin", a compound containing at least two isocyanate group and a polyol component ("hardener"). Mixing of the polyol component with the casting resin containing isocyanate groups produces a reaction mixture which, optionally after the introduction of desired additives, is cast into a mold where it is able to cure during the polyaddition reaction to form polyurethane polymers. A review of polyurethane casting systems can be found, for example, in E. W. Becker and D. Braun "Kunststoffhandbuch", Vol. 7, Polyurethanes, Verlag-Hanser, 1983 or in B. A. Dombrow, "Polyurethanes", 2nd Edition, New York (1965).

Above all, there is a need for polyol components which may be derived from renewable raw materials. Some time ago, the natural product, castor oil, was used as hydroxyl component in the production of polyurethane materials ("Plastics Laboratory"—Princetown University, "Castor Oil Polyurethanes and Applications as Potting Components", U.S.O.T., pages 99 to 165). The low viscosity of castor oil proved to be an advantage by providing for easy processing during the production of the polyurethane materials. Polyurethane materials obtained using castor oil now no longer satisfy present-day requirements in regard to tensile strength, hardness, resistance to thermal deformation and electrical properties.

2. Discussion of Related Art

Accordingly, it is proposed in DE-OS 36 30 264 and European patent application 0 125 579 to use ring-opening products of epoxidized triglyceride oils with monohydric lower alcohols instead of castor oil as the polyol component. However, polyurethane materials based on polyether polyols show a greater tendency towards inflammability and a pronounced tendency towards hydrophilicity. In particular, the tendency towards hydrophilicity leads to increased bubble formation during the processing and/or storage of the polyurethane materials in the presence of atmospheric moisture, so that product quality is reduced.

Improved flameproof behavior and greater stability to hydrolysis is observed in the case of polyurethane materials based on polyester polyols.

U.S. Pat. Nos. 2,882,249 and 4,025,477 relate to polyurethane materials of which the polyester polyol component has been produced by ring-opening of epoxidized soybean oil with ricinoleic acid (U.S. Pat. No. 2,882,249) or with acrylic acid (U.S. Pat. No. 4,025,477). In both patent specifications, the polyurethane materials are produced by reaction of the isocyanate component with the polyester polyols either with heating or in the presence of an organic solvent. However, relatively high temperatures are undesirable in the production of polyurethane materials because polyurethanes have the characteristic of reversion i.e. back reaction of the urethane bonds to the starting materials. In addition, the use of organic solvents is both ecologically and economically questionable and should therefore be avoided.

In the production of polyurethane materials, the problem of inadequate compatibility of the isocyanate component with the polyol component often arises, so that unwanted separation and clouding can occur in the final polyurethane material. In addition, the production of polyurethane materials requires starting materials of low viscosity so that production and processing can be carried out in the absence of bubble formation.

Accordingly, the problem addressed by the present invention was to enable isocyanate-compatible polyester polyols of low viscosity to be used as polyol component in the production of polyurethane materials by casting. Using polyester polyols such as these, polyurethane materials would even be able to be produced without having to work at elevated temperatures or in the presence of an organic solvent. In addition, polyurethane materials obtained using the polyester polyols in question would be of very low viscosity and would be substantially inflammable and would also show improved properties in relation to polyurethane materials obtained from castor oil.

Accordingly, the present invention relates to the use of reaction mixtures containing polyester polyols, which can be cast at room temperature and which have been obtained by at least partial ring opening of epoxidized esters with carboxylic acids, as polyol component in the production of polyurethane materials by casting.

In the context of the invention, reaction mixtures containing polyester polyols are understood to be ring-opening products of epoxidized esters with carboxylic acids which, on a statistical average, contain more than 1 and preferably more than 1.5 free hydroxyl groups and ester groups per molecule.

According to the invention, it is possible to use esters of epoxidized acids and/or epoxidized alcohols. The production of an ester containing an epoxidized alcoholic component is normally carried out by epoxidation of the unsaturated alcohol after esterification thereof with a carboxylic acid. The production of an ester containing an epoxidized acid component is normally carried out by epoxidation of an unsaturated carboxylic acid after esterification thereof with an alcohol. The production of an ester containing both an epoxidized alcohol component and an epoxidized acid component is carried out by a combination of the above methods. The epoxidation is carried out by methods known per se, for example by complete or substantially complete epoxidation by the process according to DE-PS 10 42 565. Partial epoxidation is also possible when a polyunsaturated compound is present, although in that case the epoxidized esters formed must contain on a statistical average more than one epoxide group per molecule.

It is preferred to use esters of epoxidized carboxylic acids with monohydric to trihydric alcohols containing up to 40 carbon atoms, preferably up to 36 carbon atoms and, more preferably, 1 to 22 carbon atoms. Particularly preferred esters are triglycerides with epoxidized carboxylic acids and, more particularly, with epoxidized fatty acids containing up to 40 carbon atoms, preferably up to 36 carbon atoms and, more preferably, up to 22 carbon atoms. Suitable starting materials for the preferred epoxidized triglycerides are any of the numerous animal and/or vegetable triglycerides with mono- and-/or polyunsaturated fatty acid residues, such as palm oil, lard, ground nut oil, rapeseed oil, cottonseed oil, soybean oil, train oil, sunflower oil, coriander oil and/or linseed oil. In one preferred embodiment of the invention, epoxidized soybean oil (epoxide oxygen content 5.8 to 6.5% by weight), epoxidized sunflower oil of high and/or low oleic acid content (epoxide oxygen content 4.4 to 6.6% by weight), epoxidized linseed oil (epoxide oxygen content 8.2 to 8.6% by weight) and epoxidized train oil (epoxide oxygen content 6.3 to 6.7% by weight) are used as the epoxidized esters.

According to the invention, the epoxidized reaction components are completely or at least substantially completely ring opened by delayed addition to carboxylic acids introduced beforehand, preferably in accordance with earlier German patent application P 39 35 127.0. According to the invention, monocarboxylic acids are initially introduced for the ring opening reaction. Suitable monocarboxylic acids are synthetic, natural, aliphatic, aromatic, araliphatic and/or cyclic carboxylic acids or mixtures thereof. Monocarboxylic acids or mixtures of saturated, unsaturated, branched and/or unbranched carboxylic acids containing up to 24 carbon atoms and preferably 6 to 18 carbon atoms are preferably used, caprylic acid, capric acid, behenic acid, palmitoleic acid, oleic acid, linoleic acid and/or linolenic acid being particularly preferred.

The epoxidized reaction components are introduced with delay into carboxylic acids introduced beforehand, preferably in quantities of up to 1:10, more preferably in at most equimolar quantities and, most preferably, in slightly less than equimolar quantities, expressed as mol-% epoxide and based on mol-% acid groups. According to the invention, the delayed addition of the epoxidized reaction component is carried out in such a way as to avoid substantial proportions of unreacted epoxide groups in the reaction mixture. Quantitative determination of the substantial proportions in the process according to the invention is carried out by comparison with the unreacted epoxide groups by the so-called one-pot process. In the one-pot process, the epoxidized reaction components are completely added all at once to the carboxylic acid introduced beforehand. Under the same reaction conditions, i.e. the same type and quantities of epoxidized reaction components and carboxylic acids initially introduced, the content of unreacted epoxide groups in the reaction mixture after addition of the total quantity of epoxidized reaction component is lower by up to 50%, expressed as the epoxide oxygen content in % by weight and based on the reaction mixture as a whole, in the dropwise addition process according to the invention than in the one-pot process. Distinctly lower contents can be obtained if the addition rate is kept very low. For economic reasons, however, the addition should be made as quickly as possible and preferably in 1.5 hours or less. The content of unreacted epoxide groups may be determined by titration using R. R. Jay's method (Analytische Chemie 36 (1964), pages 667 et am).

According to the invention, the epoxidized reaction components are added to carboxylic acids introduced beforehand, the carboxylic acids having been heated to temperatures above 80° C. and below 300° C. and preferably to temperatures above 100° C. and below 270° C. The actual reaction temperature is determined above all by the carboxylic acids introduced beforehand. Thus, reaction temperatures in the lower range are preferred with lower carboxylic acids while reaction temperatures in the upper range are preferred for higher carboxylic acids to ensure that the carboxylic acids are present in the liquid state. The reaction mixture is left to react at the above-mentioned reaction temperatures until an absolute residual epoxide oxygen content in the reaction mixture of less than 1.0% by weight, preferably less than 0.5% by weight and, more preferably, less than 0.3% by weight is reached.

According to the invention, the excess carboxylic acids, if any, are removed from the reaction mixture after the epoxide groups have reacted off to the desired residual epoxide content. The excess carboxylic acids are preferably removed by distillation in vacuo, although they may also be removed by other methods of separation, such as neutralization with a base and, optionally, subsequent filtration. The removal of the carboxylic acids by distillation requires different temperatures according to the carboxylic acids used and the vacuum applied, although they should not exceed the preferred reaction temperatures of up to 300° C.

According to the invention, particularly preferred reaction mixtures containing polyester polyols are those which contain a high percentage of monomeric polyester polyols, the monomers containing on a statistical average more than 1 and preferably more than 1.5 free hydroxyl groups and—adjacent the hydroxyl group—ester groups of the carboxylic acid initially introduced. In addition, the polyester polyol mixtures used in accordance with the invention contain dimeric, trimeric and/or higher condensates which are formed, for example, by epoxide ring opening with ester polyols already present. It is possible by gel permeation chromatography (GPC) (standard: (poly)styrene), to show that the polyester polyol mixtures used in accordance with the invention contain up to 50%, preferably up to 45% and, more preferably, around 40% by volume of The reaction mixtures containing polyester polyols preferably used have Höppler viscosities (DIN 53 015) at 20° C. below 9,000 mPa.s, preferably below 6,000 mPa.s and, more preferably, in the range from 50 to 5,000 mPa.s. These reaction mixtures containing polyester polyols can thus be cast at room temperature (20° C. to 25° C.).

According to the invention, particularly preferred reaction mixtures containing polyester polyols are those which have been ring-opened by ring opening of epoxidized soybean oil epoxide (epoxide oxygen content approximately 6.8% by weight) with head fractionated fatty acid—a fatty acid mixture of $C_8$ acids and $C_{10}$ acids which has an acid value of 300 to 400. The reaction mixtures containing polyester polyols thus produced have Höppler viscosities at 20° C. of the order of 4,000 mPa.s.

The reaction mixtures containing polyester polyols may either be used individually or in admixture with polybutadiene diols as polyol component in the production of polyurethane casting resins. DE-PS 2 847 383 describes mixtures of polyether/polyester polyols with polybutadiene diol as polyol component in the production of polyurethane materials. However, the polyether/polyester polyols used there have a relatively low equivalent rate of 350 so that relatively short-chain polyurethane materials which are friable and can be disintegrated by hand are obtained using polybutadiene diol and the internal plasticizer, 2-octyl dodecanol, and aromatic diisocyanates.

DE-OS 25 30 676 describes a process for the production of polyurethane materials which may be used, for example, for electrical applications. In this process, polyester polyols, polyether polyols and a polyhydroxy polymer of a 1,3-diene hydrocarbon containing 4 to 12 carbon atoms are used as the polyol component in quantities of 5 to 40% by weight, based on the total weight of the reactants. However, the only suitable polyester polyols based on renewable raw materials which are mentioned are the diglycerides of hydroxyl-containing castor oil, tall oil, soybean oil, linseed oil, etc.

According to the invention, the reaction mixtures containing polyester polyols may be used individually or in admixture with polybutadiene diol as the polyol component; polybutadiene diol may even be the predominant component. The polybutadiene diol is preferably used in quantities of 20 to 80 % by weight and, more preferably, in quantities of 40 to 60 % by weight. The quantities in which the polybutadiene diol are added are primarily determined by the required properties of the polyurethane casting resin. On the one hand, additions of polybutadiene diols improve the elastic properties (measured as the Shore A hardness at 27° C.) of the polyurethane materials. On the other hand, the polybutadiene diol, which in addition is expensive, has a high viscosity (approx. 9,000 mPa.s according to Höppler at 25° C.), so that the polybutadiene diol content should be as low as possible in the interests of favorable processing.

Hydroxyl-terminated polybutadiene diol having a average molecular weight of approximately 3,000 and a degree of polymerization of the order of 50 is used in accordance with the invention. The terminal primary hydroxyl groups are mainly in an allylic arrangement. The predominant configuration of the preferred polybutadiene diol is a trans-1,4-isomer which is present in admixture with the other cis-1,4- and vinyl-1,2-structures. The functionality of the polybutadiene diol used is preferably in the range from 2 to 3 and more preferably in the range from 2.2 to 2.6. Polybutadiene diol is commercially available and is marketed, for example, by the American firm Atlantic Richfield Company which, for product information, has published a general brochure on polybutadiene diol in which the properties, configuration data and possible reactions of, polybutadiene diols are described.

One particular advantage of the invention is that the described reaction mixtures containing polyester polyols can be mixed in any ratio with the polybutadiene diols. For example, the viscosity of the polyol component can be determined very effectively through the ratio in which the reaction mixture containing polyester polyols is mixed with the polybutadiene diol. Since the polybutadiene diol used in accordance with the invention basically has a viscosity of the order of 9,000 mPa.s, polyol components having desired viscosity values can be obtained by calculated additions of the reaction mixtures containing polyester polyols having certain viscosities which vary according to the epoxidized esters and ring-opening carboxylic acids.

According to the invention, the reaction mixtures containing polyester polyols are used either individually or optionally in admixture with polybutadiene diols in the reaction with diisocyanates to polyurethane casting systems. To this end, the polyester polyol component or the mixture of polyester polyol components is mixed with the isocyanate components in known manner.

According to the invention, the polyol component(s) is/are used in such quantities that the ratio of hardener OH groups to isocyanate groups is in the range from 1:0.9 to 1:1.3 and preferably in the range from 1:1 to 1:1.2. The isocyanates used may be any compounds containing at least two terminal isocyanate groups which are typically used for the production of polyurethane polymers. Suitable isocyanate components are any aromatic and aliphatic diisocyanates such as, for example, 1,5-naphthylene diisocyanate, 4,4'-diphenyl dimethyl methane diisocyanate, dialkyl and tetraalkyl diphenyl methane diisocyanate, the isomers of tolylene diisocyanate, optionally in admixture, 1-methyl-2,4-diisocyanatocyclohexane, 1,6-diisocyanato-2,2,4trimethyl hexane, 1,6-diisocyanato-2,4,4-trimethyl hexane, chlorinated and brominated diisocyanates, phosphorus-containing diisocyanates, butane-1,4-diisocyanate, dicyclohexyl methane diisocyanate, cyclohexane-1,4-diisocyanate, dimer fatty acid diisocyanate, tetramethyl cyclohexyl diisocyanate, isophorone diisocyanate and isomers.

According to the invention, aromatic isocyanates containing 2 to 4 isocyanate groups are particularly preferred. Suitable isocyanates such as these are both compounds which contain all the isocyanate groups on an aromatic ring or several aromatic rings conjugated with one another and also compounds which contain the isocyanate groups on several rings attached to one another by alkylene groups, for example methylene groups. 2,4-Tolylene diisocyanate and 4,4'-diphenyl methane diisocyanate ("MDI polymer"), for example, are suitable. In other embodiments, mixtures of 4,4'-diphenyl methane diisocyanate with isocyanates of higher functionality, for example with substituted diphenyl methane diisocyanates, which contain another aromatic ring bearing isocyanate groups as substituent are used as the isocyanate component. Commercially available liquid crude mixtures of diphenyl methane diisocyanate ("MDI polymer") , which still contain oligomeric polyphenylene polymethylene polyisocyanate, are particularly preferred. Of these liquid crude mixtures, those which have an average functionality of 2 to 2.5 isocyanate groups per molecule are preferably used.

In one particular embodiment of the present invention, the polyol component(s) are used in the so-called one-shot process, i.e. the starting materials are directly mixed with one another, generally with simultaneous addition of such auxilaries as blowing agents, catalysts, foam stabilizers and flameproofing agents. Suitable catalysts are any of the catalysts known to the expert for the production of polyurethanes. Particularly suitable catalysts are tertiary amines differing widely in structure, such as diazabicyclooctane (Dabco), triethyl amine and dimethyl benzyl amine. Other suitable additives are known additives of the type typically used in the production of polyurethane materials, including for example fillers, pigments and/or so-called drying agents. According to the invention, the zeolite pastes known to the expert are preferably used as drying agents.

The polyurethane resin mixtures obtained by the use in accordance with the invention of the reaction mixtures containing polyester polyols, optionally in admixture with polybutadiene diols, are liquid and of relatively low viscosity. They may readily be cast into shape and may be cured, optionally at slightly elevated temperatures.

Solid polyurethane materials having excellent hardness, strength and dimensional stability and also electronic volume resistances can be obtained by the use of the reaction mixture containing polyester polyols in accordance with the invention. Accordingly, these polyurethane materials are particularly suitable for applications in the field of electrical insulation. In addition, the new polyurethane materials are obtained from starting materials which emanate from native sources and may be readily obtained therefrom in high yields by inexpensive methods. Polyurethane materials having a wide range of properties can be obtained by variation of the reaction mixtures containing polyester polyols with polybutadiene diols and the diisocyanates.

EXAMPLES

A. Preparation of the reaction mixture containing polyester polyols

Example 1

1225 g head fractionated fatty acid (60% $C_8$, 35% $C_{10}$, acid value 361.9), corresponding to 7.9 mol based on the acid value, were initially introduced into the reaction vessel and heated with stirring to 150° C. 1770 g soybean oil epoxide (epoxide oxygen content 6.784 by weight), corresponding to 7.5 mol based on the epoxide content, were added while stirring with delay (60 minutes) so that the absolute content of unreacted epoxide-groups in the reaction mixture did not exceed 1.6% by weight. After, the addition, the reaction temperature was slowly increased to 170° C. and the reaction mixture was kept at that temperature until the residual epoxide oxygen content had fallen below 0.15% by weight (2 hours). The head fractionated fatty acid reacted (470 g) was distilled off in vacuo (below 10 Pas) at up to 200° C.

A reaction mixture containing polyester polyols was obtained in the form of a clear yellow liquid having the following characteristic data: OH value approx. 95, saponification value 235, acid value 1.5, iodine value approx. 3.5, $H_2O<0$. it by weight, Höppler viscosity at 25° C. approx. 4,000 mPa.s.

Example 2

50 Parts by weight of the reaction mixture containing polyester polyols prepared in accordance with Example 1 were thoroughly stirred with 50 parts by weight of the polybutadiene diol R-45 HT, a product of Atochem Deutschland GmbH (of which the characteristic data are shown in Comparison Example 2).

The mixture obtained had a Höppler viscosity at 27° C. of 4,200 mPa.s.

Comparison Example 1

A commercially available castor oil having the following characteristic data was used as the polyol component: OH value 161, saponification value approx. 180, iodine value 86, $H_2O<0\%$ by weight, Höppler viscosity at 25° C. approx. 700 mPa.s.

Comparison Example 2

A commercially available polybutadiene diol (R-45 HT, a product of Atochem Deutschland GmbH) having the following characteristic data was used as the polyol component: OH value 46.6, iodine value approx. 400, molecular weight approx. 2,800, Höppler viscosity at 25° C. approx. 9,000 mPa.s, $H_2O<0.1\%$ by weight.

Example 3

The polyol components described in Examples 1 and 2 and in comparison Examples 1 and 2 were mixed in the quantities shown in Table 1 (parts by weight) with the quantities—also shown in Table 1—of diphenyl methane diisocyanate mixture (MDI polymer) containing 30 to 33% by weight NCO in a standard mixer, a drying agent (zeolite paste) being introduced as additive in the quantitites (parts by weight) shown in Table 1. No catalyst was used in the production of this casting resin.

The properties of the casting resin systems obtained are also shown in Table 1.

TABLE 1

|  | Ex. 1 | Ex. 2 | Comp. Ex 1. | Comp. Ex 2 |
| --- | --- | --- | --- | --- |
| % By weight polyol component | 100 | 100 | 100 | 100 |
| Höppler viscosity at 27° C. in mPa · s | 3100 | 4200 | 650 | 8100 |
| % By weight isocyanate MDI polymer 30-33% by NCO | 25 | 18 | 40 | 11 |
| Drying agent zeolite paste % by weight | 5 | 5 | 5 | 5 |
| Pot life | >3 h | Approx. 50 mins. | Approx. 25 mins. | Approx. 40 mins. |
| Properties of the casting resin after reaction | | | | |
| Shore A hardness (27° C.) after | | | | |
| 24 h | — | 26 | 57 | — |
| 48 h | 35 | 31 | 63 | — |
| 72 h | 42 | 35 | 66 | — |
| 168 h | 50 | 40 | 68 | — |
| Volume resistivity after 168 h Ohm · cm | $2 \cdot 10^{15}$ | $6 \cdot 10^{15}$ | $3 \cdot 10^{14}$ | $4 \cdot 10^{16}$ |

Example 4

The polyol components described in Examples 1 and 2 and in Comparison Examples 1 and 2 were mixed in the quantities shown in Table 2 (parts by weight) with the quantities—also shown in Table 2—of diphenyl methane diisocyanate mixture (MDI polymer) containing 30 to 33% by weight NCO in a standard mixer, a drying agent (zeolite paste) being introduced as additive in the quantities (parts by weight) shown in Table 2. In contrast to Example 3, diazabicyclooctane in the quantities shown in Table 2 was added as catalyst during mixing of the components. The properties of the casting resin systems obtained are also shown in Table 2.

TABLE 2

|  | Ex. 1 | Ex. 2 | Comp. Ex 1. | Comp. Ex 2 |
| --- | --- | --- | --- | --- |
| % By weight polyol component | 100 | 100 | 100 | 100 |
| Höppler viscosity at 27° C. in mPa · s | 3100 | 4200 | 650 | 8100 |
| % By weight isocyanate MDI polymer 30-33% by NCO | 25 | 18 | 40 | 11 |
| Drying agent | 5 | 5 | 5 | 5 |

TABLE 2-continued

|  | Ex. 1 | Ex. 2 | Comp. Ex 1. | Comp. Ex 2 |
|---|---|---|---|---|
| zeolite paste % by weight |  |  |  |  |
| Catalyst (Dabco) % by weight | 0.5 | 0.5 | 0.5 | 0.5 |
| Pot life | 10 mins. | 7 mins. | 9 mins. | 5 mins. |
| Properties of the casting resin after reaction |  |  |  |  |
| Shore A hardness (27° C.) after |  |  |  |  |
| 24 h | 56 | 47 | 60 | 27 |
| 48 h | 58 | 48 | 64 | 30 |
| 72 h | 61 | 49 | 66 | 32 |
| 168 h | 61 | 51 | 68 | 33 |
| Volume resistivity after 168 h Ohm · cm | $4.5 \cdot 10^{15}$ | $1.6 \cdot 10^{15}$ | $1.3 \cdot 10^{14}$ | $4 \cdot 10^{16}$ |
| Tensile strength MPa | 1.4 | 0.6 | 1.4 | 0.18 |
| Elongation % | 38.8 | 38.8 | 30.6 | 79.5 |

We claim:

1. The process of producing a polyurethane material which can be cast at room temperature, comprising mixing a compound containing at least two isocyanate groups per molecule in the presence of a polymerization catalyst with a reaction mixture containing a polyester polyol, said polyester polyol having been prepared by at least partial ring opening of an epoxidized ester with a carboxylic acid wherein said epoxidized ester has been added slowly to said carboxylic acid.

2. A process as in claim 1 wherein said polyester polyol contains on average more than 1 free hydroxyl group and ester group per molecule.

3. A process as in claim 1 wherein said polyester polyol comprises an ester of an epoxidized carboxylic acid with a monohydric to trihydric alcohol containing up to 40 carbon atoms.

4. A process as in claim 1 wherein said epoxidized ester has been added slowly to said carboxylic acid to avoid substantial amounts of unreacted epoxide groups in said reaction mixture.

5. A process as in claim 1 wherein said carboxylic acid has been heated to a temperature of between above 80° C. and below 300° C. prior to addition of said epoxidized ester to said carboxylic acid.

6. A process as in claim 5 wherein said mixture has been reacted until an absolute residual epoxide oxygen content in said reaction mixture of less than about 1.0% by weight is obtained.

7. A process as in claim 1 wherein said reaction mixture has a Hoeppler viscosity at about 20° C. of below 9,000 mPa.s.

8. A process as in claim 1 wherein said polyester polyol has been produced by ring opening of an epoxidized ester containing more than one epoxide group.

9. A process as in claim 1 wherein said polyester polyol has been produced by ring opening of an epoxidized triglyceride.

10. A process as in claim 1 wherein said reaction mixture further contains a polybutadiene diol.

11. A process as in claim 10 wherein said polybutadiene diol is present in the amount of from about 20 to about 80% by weight, based on the weight of said reaction mixture.

12. A process as in claim 1 wherein said reaction mixture is present in such amount that the ratio of OH groups to isocyanate groups is from about 1:0.9 to about 1:1.3.

13. A reaction mixture for producing a polyurethane material by casting, said reaction mixture comprising a polyester polyol prepared by at least partial ring opening of an epoxidized ester with a carboxylic acid wherein said epoxidized ester has been added slowly to said carboxylic acid.

14. A reaction mixture as in claim 13 wherein said polyester polyol contains on average more than 1 free hydroxyl group and ester group per molecule.

15. A reaction mixture as in claim 13 wherein said polyester polyol comprises an ester of an epoxidized carboxylic acid with a monohydric to trihydric alcohol containing up to 40 carbon atoms.

16. A reaction mixture as in claim 13 wherein said epoxidized ester has been added slowly to said carboxylic acid to avoid substantial amounts of unreacted epoxide groups in said reaction mixture.

17. A reaction mixture as in claim 13 wherein said carboxylic acid has been heated to a temperature of between above 80° C. and below 300° C. prior to addition of said epoxidized ester to said carboxylic acid.

18. A reaction mixture as in claim 17 wherein said mixture has been reacted until an absolute residual epoxide oxygen content in said reaction mixture of less than about 1.0% by weight is obtained.

19. A reaction mixture as in claim 13 wherein said reaction mixture has a Hoeppler viscosity at about 20° C. of below 9,000 mPa.s.

20. A reaction mixture as in claim 13 wherein said polyester polyol has been produced by ring opening of an epoxidized ester containing more than one epoxide group.

21. A reaction mixture as in claim 13 wherein said polyester polyol has been produced by ring opening of an epoxidized triglyceride.

22. A reaction mixture as in claim 13 wherein said reaction mixture further contains a polybutadiene diol.

23. A reaction mixture as in claim 21 wherein said polybutadiene diol is present in the amount of from about 20 to about 80% by weight, based on the weight of said reaction mixture.

* * * * *